United States Patent Office 3,493,446
Patented Feb. 3, 1970

3,493,446
METHOD FOR APPLYING A BURN INHIBITOR MATERIAL TO A COMPOSITE PROPELLANT GRAIN
John D. Braun and Edward M. Roy, China Lake, Calif., assignors to the United States of America as represented by the Secretary of the Navy
No Drawing. Filed Sept. 17, 1968, Ser. No. 761,398
Int. Cl. C06b 21/00
U.S. Cl. 149—109    1 Claim

ABSTRACT OF THE DISCLOSURE

A technique is described for providing an inhibited composite propellant grain having maximum adhesion between the grain surface and its inhibitor. The process comprises leaching the propellant grain to remove surface oxidizer, applying a layer of inhibitor, evacuating, then breaking vacuum and applying another layer of inhibitor, followed by curing as usual.

Background of the invention

Solid propellant grains are constructed or manufactured to meet the special requirements or design of the rocket motor, or other device in which they will be used. In some cases it is desirable to make a grain having a comparatively long duration of burning and to decrease the thrust by reducing the surface burning area of the propellant grain. To decrease the burning area, and hence to slow the rate of gas generation, select areas of the grain are covered with a layer of nonflammable or slow-burning material called an inhibitor. Solid propellant grains may be classified as unrestricted-burning grains (no inhibitor applied) and restricted-burning grains (covered with inhibitor). Materials which inhibit burning of the grain are generally applied by spraying, painting, dipping, pressing, or other means, to the surface of the grain on which restricted burning is required. Solid propellant grains are subject to some chemical changes on the surface and dimensional change due to variations in temperature and pressure. Often the inhibitor cracks or becomes separated from the grain during such changes and uncontrolled burning occurs on the exposed surfaces. Composite propellants consist of a metal fuel, an inorganic oxidizer and a flexible binder. Adhesion of a burn inhibitor to such a grain is difficult, largely due to the surface oxidizer which either forms a poor bond with the inhibitor, or when removed leaves voids on the surface which greatly reduce bond area. The present invention provides a process which obtains maximum adhesion between the grain surface and the inhibitor, thereby overcoming the problem of uncontrolled burning of the exposed grain surface and subsequent malfunctioning of the motor.

Summary of the invention

This invention relates to a process for applying an inhibitor to any surface of a solid composite propellant grain.

The general purpose of this invention is to provide for coating or bonding a composite propellant grain with a restrictive-burning material by a method which is reliable, simple, and inexpensive. Another object is to provide a restricted-burning composite grain having the inhibitor intimately bonded to the grain thereby providing maximum adhesion between the grain surface and the inhibitor. The method further provides a solid composite propellant grain having a burn-inhibiting coating which responds to dimensional changes due to variations in temperature and pressure.

Description of the invention

In accordance with this invention a composite solid propellant consisting essentially of a metal fuel, an inorganic oxidizer and a flexible binder was mixed, cast and cured to form a rocket propellant grain. The grain was leached with water or other suitable solvent to dispose of any oxidizer which remained on the surface of the grain. After drying, the leached grain was heated to 60° C. and a layer of uncured inhibitor was applied to its surface thick enough to fill all the surface cavities or pores left after the leaching and to provide a smooth outer layer of the inhibitor. The coated grain was then placed in a vacuum at 60° C. and 0–10 mm. pressure for 10 minutes, then the vacuum broken. Additional inhibitor was finally applied to the grain surface and the grain was heated until the inhibitor was cured.

In this new technique the surface oxidizer, if any, is first washed out by leaching which eliminates one reason for a weak bond. However, the porous surface that results is still difficult for an inhibitor to bond to because the surface cavities or pores are largely unfilled by the inhibitor material and bonding area is lost. By heating to a temperature sufficient to reduce the viscosity of the inhibitor used and pulling vacuum on the leached, freshly coated grain, air is removed from the inhibitor-coated surface and when vacuum is broken, atmospheric pressure drives the inhibitor into the cavities left by the surface oxidizer after leaching. This greatly increases the bond area and consequently the maximum bond results.

The composite propellants to which this method particularly applies are formed of a preponderant amount of solid particles of an inorganic oxidizer and a fuel uniformly distributed throughout a matrix or binder. Those oxidizers generally used include the nitrates, chlorates, and perchlorates of the alkali metals, alkaline earth metals and ammonia. Fuels include aluminum, magnesium, beryllium, and others. Suitable binders include the synthetic rubbers based on the copolymers of polybutadiene with acrylic acid, methacrylic acid, vinylidene chloride or the like, the chemical rubbers of the polyurethane type and mixtures of fluorocarbons such as polytetrafluoroethylene (Teflon) and the copolymer of vinylidene fluoride and perfluoropropylene (Viton). The composite propellant compositions also normally contain combustion modifiers or burning rate catalysts such as sodium fluoride, ferrocyanides, magnesium oxide, chromates and the like.

Included among the many inhibitors successfully used were the commercially available flexible epoxy resins which contain as basic ingredients about 20 parts by weight modified diglycidal ether of bisphenol A type epoxy resin and about 80 parts by weight polymeric amido-amine hardener. The flexible polyurethanes are also readily useable as inhibitors. The binder matrix may also be used as an inhibitor. Any suitable inhibitor will give maximum bonding to the composite grain surface by use of the process described herein because bond strength is increased due to the increased bond area for the inhibitor.

The invention herein described may be manufactured and used by or for the Government of the United States of America for governmental purposes without the payment of any royalties thereon or therefor.

What is claimed is:
1. A method for applying an inhibitor to any surface of a solid composite propellant grain, which comprises:
 (a) providing a cured composite propellant grain consisting essentially of a fuel, an inorganic oxidizer and a binder;
 (b) leaching said grain to remove any oxidizer which may remain on the surface of said grain, leaving a porous surface on said grain;
 (c) heating said leached grain;

(d) coating the surface of the heated grain with a layer of liquid, uncured burn inhibitor material thick enough to fill all of said pores and form a smooth outer surface;
(e) evacuating to 0–10 mm. pressure to remove all air bubbles from the pores in the propellant surface, while maintaining a temperature sufficient to reduce the viscosity of said inhibitor;
(f) breaking vacuum to drive said inhibitor into said pores;
(g) applying additional inhibitor to said coated surface thereby forming a smooth outer surface; and
(h) heating until said inhibitor is cured.

References Cited
UNITED STATES PATENTS

| | | | |
|---|---|---|---|
| 2,917,424 | 12/1959 | Hirsch et al. | 149—7 X |
| 2,977,884 | 4/1961 | Mahon et al. | 149—7 X |
| 3,032,437 | 5/1962 | Pitchford | 149—7 X |
| 3,107,573 | 10/1963 | Butcher | 149—7 X |

BENJAMIN R. PADGETT, Primary Examiner

S. J. LECHERT, Jr., Assistant Examiner

U.S. Cl. X.R.

102—103; 149—19, 20